United States Patent [19]

Nelson

[11] Patent Number: 4,481,842
[45] Date of Patent: Nov. 13, 1984

[54] TORQUE LIMIT DRIVE TRANSMISSION

[75] Inventor: Bertel S. Nelson, Naperville, Ill.

[73] Assignee: Wedgtrac Corporation, Yorkville, Ill.

[21] Appl. No.: 552,863

[22] Filed: Nov. 17, 1983

Related U.S. Application Data

[63] Continuation of Ser. No. 297,744, Aug. 31, 1981, abandoned.

[51] Int. Cl.³ .................. F16H 13/06; F16H 13/02
[52] U.S. Cl. ............................ 74/798; 74/206; 74/211
[58] Field of Search .............. 74/772, 773, 798, 211, 74/206

[56] References Cited

U.S. PATENT DOCUMENTS

| | | | |
|---|---|---|---|
| 1,093,922 | 4/1914 | Dieterich | 74/206 |
| 1,737,695 | 12/1929 | Zadow | 74/206 |
| 2,815,685 | 12/1957 | Parrett | 74/798 |
| 3,160,031 | 12/1964 | Bugg | 74/798 |
| 3,380,312 | 4/1968 | Barske | 74/206 |
| 3,945,270 | 3/1976 | Nelson et al. | 74/206 |

FOREIGN PATENT DOCUMENTS 128967  3/1902  Fed. Rep. of Germany ........ 74/798

Primary Examiner—Allan D. Herrmann
Assistant Examiner—Dirk Wright
Attorney, Agent, or Firm—Trexler, Bushnell & Wolters, Ltd.

[57] ABSTRACT

A roller-type drive somewhat similar to epicyclic gearing is provided wherein one of the three rollers present is a wedging roller which produces a tighter wedging action for all three planetary rollers in response to increasing torque. A stud or axle about which the wedging roller turns limits movement of the wedging roller and applies a drag thereto when a predetermined maximum torque is reached so that the drive begins to slip and does not exceed the predetermined torque desired.

11 Claims, 2 Drawing Figures

U.S. Patent   Nov. 13, 1984   4,481,842
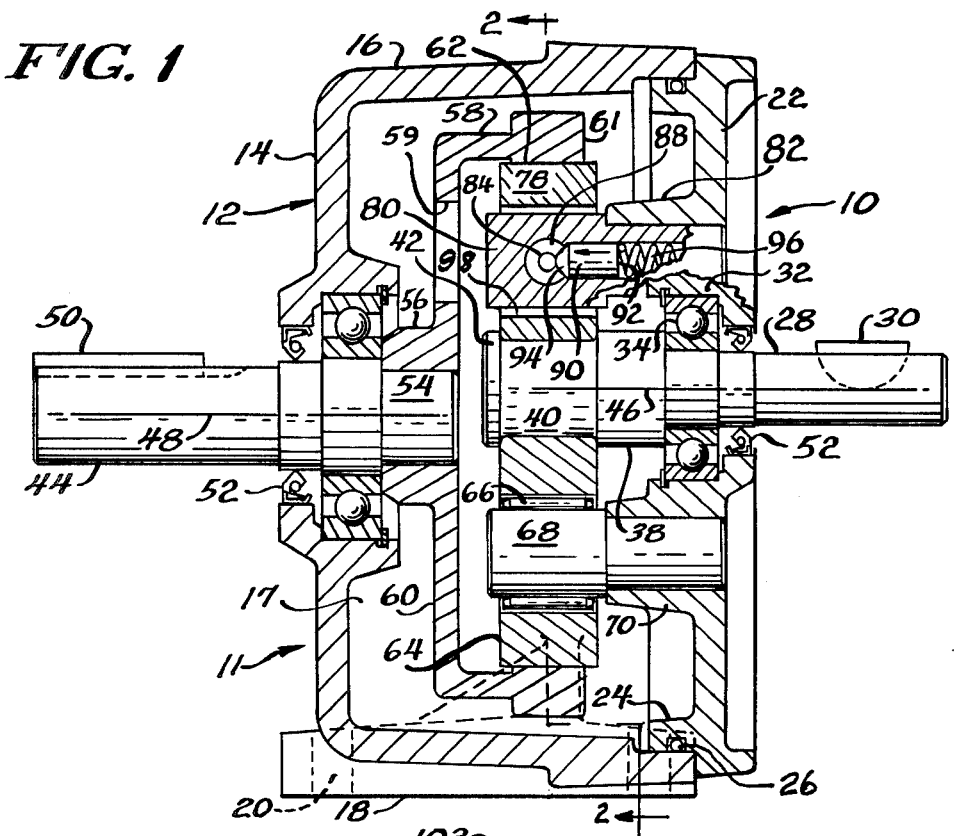
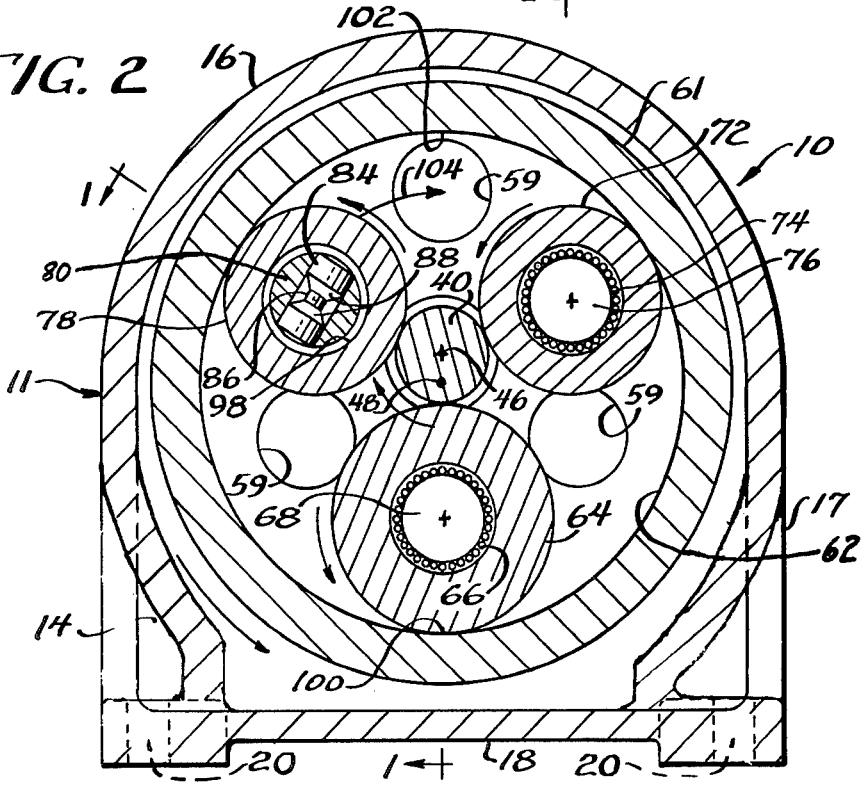

TORQUE LIMIT DRIVE TRANSMISSION

This application is a continuation of application Ser. No. 297,744, filed Aug. 31, 1981, now abandoned.

BACKGROUND OF THE INVENTION

Epicyclic gearing has long been known in which there is provided a sun gear, a plurality of planet gears, and a ring gear having internal teeth. Such drives have found use in industry, but present various problems. To overcome certain of the problems inherent in epicyclic gearing, wedging-type roller drives have been developed. Such drives are to be found, for example, in Barske U.S. Pat. No. 3,380,312 and in Nelson et al U.S. Pat. No. 3,945,270. In such drives or transmission there is an input shaft and an output shaft which are somewhat offset radially of one another. The input shaft has a cylindrical external driving portion functionally taking the place of the sun gear in epicyclic gearing. The output shaft is normally joined rigidly to a cylindrical internal ring. (Either the centrally located external cylindrical member or the internal ring member may comprise the input, and the other the output. The cylindrical external roller is used for purposes of illustration.) There are three idler rollers which act between the input roller and the driven cylindrical portion. The driver roller and two of the idler rollers turn about substantially fixed axes. The third idler roller is movable in radial and arcuate directions. The radial offset of the input and output shaft causes the radially movable idler roller to move into wedging engagement between the driving portion or sun roller and the output cylinder. This causes a certain amount of radial shifting of the drive roller due to a limited amount of deflection under load, whereby the three idler rollers apply substantially equal radial load and tangential drive force.

OBJECTS AND SUMMARY OF THE PRESENT INVENTION

It is an object of the present invention to provide a roller-type drive as heretofore described in which there is a well-defined torque limit beyond which the drive slips to prevent damage to a driven system or machine.

A further object of the present invention is to provide such a roller drive wherein a stud or axle about which the wedging roller turns provides a limit as to how far the wedging roller can move into the wedging pocket, thereby limiting the torque that can be transmitted.

In obtaining the foregoing and other objects of the present invention, a roller drive is provided comprising a housing with input and output shafts. The sense of which is the input and which is the output shaft can be reversed, depending on whether the gearing is intended to be reduction or step-up ratio. Each of the shafts is mounted in a ball bearing in the housing. The shafts are radially offset to some degree, and there is significant axial spacing between the active parts of the rollers and driven cylinder relative to the respective ball bearings to permit a slight deflection under load. There are three idler rollers, two of which are mounted by means of roller bearings on fixed axles or studs secured to a portion of the housing. The third or wedging roller is loosely mounted about a stud or axle mounted to the housing with radial and arcuate movements being possible between the wedging roller and its stud or axle. The permitted movement is sufficient that the stud or axle initially serves only as a positioning member for the wedging roller. However, when the wedging roller has moved a predetermined distance into the wedging pocket between the drive roller and the output cylinder it bottoms upon its stud or axle, and cannot thereafter move further into the pocket. This causes a drag on the wedging roller and slip between the input drive and the output drive, thereby limiting torque.

THE DRAWINGS

The invention best will be understood with reference to the following specification when taken in connection with the accompanying drawings wherein:

FIG. 1 is an axial view through a roller drive or transmission as noted heretofore; and FIG. 2 is an axial section through the drive as taken substantially along the line 2—2 in FIG. 1.

DETAILED DESCRIPTION OF THE ILLUSTRATED EMBODIMENT

Referring now in greater particularity to the drawings there will be seen a fixed ratio roller traction drive 10 constructed in accordance with the present invention. The two patents mentioned heretofore, namely, Barske U.S. Pat. No. 3,380,312 and Nelson et al U.S. Pat. No. 3,945,270 are owned by the same assignee as the present application, Wedgtrac Corporation of Yorkville, Ill., and the disclosures thereof are incorporated herein by reference to avoid prolixity. The traction drive comprises a two-piece housing 11, the first portion of which 12 has a semicylindrical shell 16 completed by tangential straight-down walls 17 and a bottom plate 18. The left end of the first portion of the housing as shown in FIG. 1 includes a wall 14 integral with the remainder of the housing portion. The substantially flat bottom 18 is provided with extended feet and access pockets, along with suitable bolt holes 20 to permit securing the housing to a suitable base with upstanding bolts extending through the base and threaded into the bores.

The second or complementary portion of the housing 11 comprises an end plate 22 complementary to the outer shell 16, 18 of the first housing portion, and having a substantially peripheral flange 24 extending axially inside of the shell of the first housing portion and secured thereto by suitable bolts or other structure (not shown) with a sealing gasket 26 extending between the two housing portions to prevent fluid leakage. The interior or the housing is filled with a traction fluid of a type well-known in the art, Monsanto Sonotrac being one particular example. A fluid film of traction fluid between moving parts becomes a semi-solid having high shear strength. It is possible to use automatic transmission fluid, but it is necessary then to make changes in the geometry of the design and to lose load capacity. Accordingly, it is preferred to use traction fluid.

An input shaft 28 is provided with a key 30 for keying to a driving shaft, as from an electric motor, and extends through the end plate 22, being mounted in an interior boss 32 thereof by means of a ball bearing 34. Ball bearing 34 locates shaft 28 axially and also provides part of the radial support for shaft 28. Shaft 28 is formed with the driving portion 40 adjoined by a slightly larger shoulder diameter at each side which serves to locate the idler rollers, 64, 72, and 78, axially. An output shaft 44 extends axially in the opposite direction from the input shaft 42, and is radially offset somewhat therefrom, as may be seen with reference to the center lines 46 and 48 of the input and output shafts, respectively.

The output shaft is provided with a suitable keyway and key 50 for securing to a driven shaft or other system. Both shafts are provided with peripheral seals 52 encircling the shafts and mounted in the respective housing portions to prevent leakage of traction fluid. The end portion 54 of the output shaft mounts by means of a boss 56 and a suitable key or other structure a driven cylinder 58 having a circular disc or plate portion 60 joining the boss 56 and cylinder 58. The web or plate 60 preferably is provided with oil passage holes 59. The cylinder 58 is provided adjacent its end with a portion of increased radius hereinafter referred to as an output ring 61 having an inner cylindrical drive surface 62.

A support roller or roll 64 is journalled by means of roller bearings 66 on a stud or axle 68 mounted in a boss 70 of the housing plate 22. The center line of this boss is in vertical alignment with the center lines 46 and 48 of the respective shafts 28 and 44. This roller 64 is of greater diameter than the rollers subsequently to be described, and forms a tight fit between the input roller 40 and the output ring 61.

A reaction roll 72 is mounted by means of roller bearings 74 on a stud or axle 76 which is mounted in another boss (not shown) on the housing plate 22. This roller is of somewhat less diameter so as to form a tight fit between the driving roll 42 and the output ring 61, bearing in mind the offset of the axes thereof. The center line of the reaction roll 72 is about 30° above a horizontal through the center 48 of the output shaft 44. It is spaced 120° from the center line of the stud 68 and support roll 64.

A wedge roll 78 of the same diameter as the reaction roll 72 is displaced another 120° in a counter-clockwise direction as shown in FIG. 2 from the position of the reaction roll 72. In other words, the centers of the three rolls or rollers are mutually spaced at approximately 120°. The wedge roll is not provided with a bearing, and fits in spaced relation about a stud or axle 80 fixed in a boss 82 on the housing plate 22. The stud 80 at its outer end is provided with a crosspin 84 having a necked-in center section 86 having beveled or oblique shoulders 88 on opposite sides thereof. The crosspin 84 is located in a one o'clock-seven o'clock position relative to the wedge roll 78 as viewed in FIG. 2. The crosspin or plunger 84 is capable of moving axially of its own axis. A plunger 90 is provided in a bore 92 of the stud or axle 80 and has a tapered nose 94 which is urged into the necked portion 86 of the crosspin or plunger 84, pressing against the oblique shoulders or faces 88 thereof under the impetus of a helical spring 96 in the aforesaid bore 92. In idle position the crosspin or plunger 84 bears in a clockwise direction against the inner surface 98 of the wedge roll 78.

Due to the offset center lines of the input shaft 28 and output shaft 44 the spacing between the drive roll 40 and the output ring decreases from the bottom portion of the output ring where it is intersected by the vertical section line at 100 to the upper portion of the output ring where it is intersected by the vertical section line at 102. Thus, the pin 84 holds the wedge roll 78 up and to the right into the pocket that is formed by the decreasing spacing.

In operation the input shaft 28 turns in a clockwise direction as viewed in FIG. 2. This causes the support roll 64, the reaction roll 72, and the wedge roll 78 all to turn in a counter-clockwise direction, all as indicated by the arrows adjacent them. This rotation causes the wedge roll to move arcuately of the output ring and input roll in a generally clockwise direction as indicated by the arrow 104. This moves the wedge roll further into the pocket between the input roll and the output ring. Although the parts are made of steel there is a certain amount of elasticity or resilience to steel, and the input roll will move arcuately in the clockwise direction a significant amount (such as 1/8) depending on load being transmitted, physical size of the drive and design resiliency of the drive system. This causes additional pressure on the support roll and the reaction roll so that the three idler rolls share the load substantially equally. For purposes of reference, the specific illustrated embodiment of the invention to which the figures just given apply has a drive ratio (reduction) of about 4.1 to 1. The inner diameter of the output ring has a bore of $3\frac{5}{8}$ inches, while the wedge roll has a diameter of approximately 1-5/16 inches.

When the wedge roll has moved approximately one-eighth inch into the pocket the inner bore thereof will bottom on the stud or axle 80. This prevents the wedge roll from moving farther into the pocket, and also provides a drag on the wedge roll. Consequently, the drive begins to slip, and no greater torque can be transmitted. The value of the torque limit is controlled by the dimensions of the various parts and by the elasticity thereof. The unit can operate for several seconds in slip without damage to the apparatus. During this time a motor overload circuit or other protective device operates to prevent extended slip.

The direction of rotation of the various parts has been set forth heretofore. The output ring 61 can comprise the input member with the roll 40 serving as the driven member. The direction of drive must be reversed to that disclosed in order to force the wedge roll into the pocket. In such an instance the drive comprises a step-up gearing, rather than a step-down.

Speed ratios of the input and output shafts can easily vary according to the dimensions chosen from about 2.5 to 1 to about 10 to 1. Drive in an opposite direction is not possible. The parts simply overrun if the input roll 40 is turned in a counter-clockwise direction in FIG. 2, rather than clockwise. This is important in that one specific example the traction drive disclosed herein is used in combination with an ice cream-making machine. The power source is a three-phase electric motor. If two of the wires to the motor should be interchanged in installation the motor would turn in the wrong direction. This could cause extensive damage to the driven machinery were it not for the overrunning provision with reverse input drive.

Although the ball bearings for the input and output shafts generally position these shafts, the elasticity and bending of the parts outboard of the rollers results in the additional support of the shafts being through the various drive rollers. The roller components are hardened steel, and as noted heretofore, lubrication is preferably provided by suitable traction fluid. Under normal full load there is a "creep" of approximately 0.5%. Accordingly, the output speed of rotation equals 0.995 times the input speed of rotation, divided by the ratio of the ring internal diameter to the inner roller external diameter.

As noted, the design is for unidirectional rotation. Rotation in the opposite sense can be provided by interchanging the reaction roll and the wedge roll, and their respective studs or axles. As noted, the offset between the input and output shafts provides a wedging action which increases proportionally to the torque being transmitted, up to the point where the torque limit is reached and the drive begins to slip. Although the wedge roll is spring loaded for initial contact, it is shown in the drawings substantially in normal full load position, whereby the crosspin 84 does not engage the internal bore of the wedge roll.

The specific example of the invention as herein shown and described is for illustrative purposes only. Various changes will no doubt occur to those skilled in the art, and will be understood as forming a part of the present invention insofar as they fall within the spirit and scope of the appended claims.

The invention is claimed as follows:

1. Roller friction gearing comprising a driving shaft, a driven shaft, the center lines of said shafts being parallel but offset radially of one another, an external annular roller-engaging surface secured to one of said shafts, means secured to the other of said shafts and having an internal annular roller-engaging surface, the spacing between said surfaces varying due to the offset of the center lines of said shafts and providing a narrowing pocket between said surfaces in the direction of rotation of the driving shaft, a plurality of rollers between said surfaces and acting to transmit torque from said driving shaft to said driven shaft, one of said rollers being a wedging roller of predetermined outside diameter mounted in said pocket and capable of moving further into said pocket as torque transmitted between said shafts causes relative deformation thereof, and positive means for limiting movement of said one roller substantially radially thereof a predetermined distance into said pocket to induce slip between said rollers and said surfaces to limit the torque that can be transmitted from said driving shaft to said driven shaft, said predetermined distance being very small compared to said predetermined diameter.

2. Roller gearing as set forth in claim 1 and further including means for applying a drag to said one roller to help induce slip.

3. Roller gearing as set forth in claim 1 or claim 2 wherein said one roller has an axial bore and wherein there is a shaft about which said bore fits loosely, said shaft limiting movement of said roller into said pocket and applying a drag to said one roller.

4. Roller gearing as set forth in claim 1 wherein said plurality of rollers comprises a total of three.

5. Roller gearing as set forth in claim 1 and further including means initially biasing said one roller into said pocket.

6. Roller gearing as set forth in claim 5 wherein said one roller has an axial bore, a shaft loosely receiving said bore, and resilient biasing means acting between said shaft and said bore initially to bias said one roller into said pocket.

7. Roller friction gearing comprising a driving shaft, a driven shaft, the center lines of said shafts being parallel but offset radially of one another, an external annular roller-engaging surface secured to one of said shafts, means secured to the other of said shafts and having an internal annular roller-engaging surface, the spacing between said surfaces varying due to the offset of the center lines of said shafts and providing a narrowing pocket between said surfaces in the direction of rotation of the driving shaft, a plurality of rollers between said surfaces and acting to transmit torque from said driving shafts to said driven shaft, one of said rollers being a wedging roller mounted in said pocket and capable of moving further into said pocket as torque transmitted between said shafts causes relative deformation thereof, and positive means for limiting movement of said one roller into said pocket to induce slip between said rollers and said surfaces to limit the torque that can be transmitted from said driving shaft to said driven shaft, means initially biasing said one roller into said pocket, said one roller having an axial bore, a shaft loosely receiving said bore, and resilient biasing means acting between said shaft and said bore initially to bias said one roller into said pocket, said shaft having a cross-bore and a crosspin therein, and resilient means bearing on said crosspin to cause said crosspin to engage said cross-bore resiliently to bias said one roller initially into said pocket.

8. Roller gearing as set forth in claim 7 wherein said crosspin has a necked portion, and a biasing pin having a tapered end resiliently biased into said necked portion.

9. Roller friction gearing comprising a fixed housing having two end portions, a driving shaft jornalled in one of said end portions, a driven shaft journalled in the other of said end portions, the center lines of said shafts being parallel but offset radially of one another, an external annular roller-engaging surface connected to one of said shafts and having an internal annular roller-engaging surface, the spacing between said surface varying due to the offset of the center lines of said shafts and providing a narrowing pocket between said surfaces in the direction of rotation of the driving shaft, and a plurality of rollers on axles mounted from one of said end portions and engaging said surfaces, at least one of said rollers being a wedging roller of predetermined internal diameter and fitting loosely about its axle for radial movement relative thereto, said last mentioned axle having a predetermined outside diameter only slightly less than said predetermined inside diameter, said one roller being received in said pocket, the difference between said outside diameter and said inside diameter being predetermined such that the axle of said roller limits movement of said roller into said pocket by a distance substantially equal to the predetermined difference between said diameters and applying a drag thereon whereby to induce slip between said rollers and said surfaces to limit the torque that can be transmitted from said driving shaft to said driven shaft.

10. Roller gearing as set forth in claim 9 wherein there is a total of three rollers and the two rollers other than said one roller are rotationally mounted on their axles by means of bearings.

11. Roller gearing as set forth in claim 9 or claim 10 wherein said shafts are journalled in said end portions by ball bearings.

* * * * *